United States Patent [19]

Enomoto et al.

[11] Patent Number: 5,265,819
[45] Date of Patent: Nov. 30, 1993

[54] PHOTOGRAPHIC FILM CASSETTE

[75] Inventors: Masahiro Enomoto; Kiichiro Kitagawa; Koichi Takahashi, all of Kanagawa, Japan

[73] Assignee: Fuji Photo Film Co., Ltd., Kanagawa, Japan

[21] Appl. No.: 757,429

[22] Filed: Sep. 10, 1991

[30] Foreign Application Priority Data

Sep. 10, 1990 [JP] Japan ............................... 2-240395
Jul. 17, 1991 [JP] Japan ............................... 3-202516

[51] Int. Cl.$^5$ ........................................... G03B 17/26
[52] U.S. Cl. ................................................ 242/71.1
[58] Field of Search ................. 242/71.1, 71.2, 71.7; 354/275

[56] References Cited

U.S. PATENT DOCUMENTS

| 3,104,846 | 9/1963 | Ringle | 242/71.1 |
| 3,945,584 | 3/1976 | Mangan | 242/71.1 |
| 4,948,063 | 8/1990 | Niedospial, Jr. | 242/71.1 |

FOREIGN PATENT DOCUMENTS

| 50-33831 | 4/1975 | Japan . |
| 54-29033 | 2/1979 | Japan . |
| 57-190948 | 11/1982 | Japan . |
| 59-48762 | 3/1984 | Japan . |
| 63-26697 | 5/1988 | Japan . |

*Primary Examiner*—Stanley N. Gilreath
*Attorney, Agent, or Firm*—Sughrue, Mion, Zinn, Macpeak & Seas

[57] ABSTRACT

A photographic film cassette has first and second shell halves constituting the cassette shell. At least one first engaging portion is formed on the first shell half. At least one second engaging portion is formed on the second shell half for being engaged with the first engaging portion so as to join the two shell halves integrally. The second engaging portion is disengaged from the first engaging portion to disassemble the cassette shell in order to take out the photographic film with the spool. In accordance with a another embodiment, at least one joining member is engaged with the two shell halves.

7 Claims, 6 Drawing Sheets

PHOTOGRAPHIC FILM CASSETTE

BACKGROUND OF THE INVENTION

The present invention relates to a photographic film cassette, more particularly to a film cassette of having a cassette shell made of a resin material.

Description of the Related Art

In a photographic film cassette, a photographic film is wound on a spool and contained in a cassette shell in light-tight fashion. The cassette shell consists of a plurality of shell parts, which are assembled together so as to support the spool in a rotatable fashion. Japanese Patent Laid-open Publication Nos. 50-33831 and 57-190948 disclose cassette shells consisting of a plurality of shell parts molded from resin, which are joined together by ultrasonic welding and an adhesive agent. Film cassettes provided with a DX code indication on the cassette shell for indicating characteristics of the photographic film, e.g. a film sensitivity and a maximum photographable number of frames, are also well known as described Japanese Utility Model Laid-open Publication No. 54-29033 and Japanese Patent Laid-open Publication No. 59-48762. Such a DX code is read automatically by a camera into which the cassette has been inserted and a photographic printer through an electrical or mechanical reading device.

If an ultrasonic wave is used for welding the cassette shell, however, the spool in contact with the cassette shell might be welded thereto so that the photographic film might not be fed toward the outside of the cassette. If an adhesive agent is used, an outer surface of the cassette shell might be degraded with a surplus of adhesive agent that was squeezed out of a juncture during a welding operation.

Also, the shell parts may be too intensely welded with ultrasonic waves and adhesive agents, causing difficulty in removing the film after exposure. In such a case, the exposed film is likely to be scratched or damaged by broken pieces of the cassette shell when the cassette shell is broken to remove the film.

In addition, poor adhesion by either welding or use of an adhesive agent may cause degradation in the light-tight properties of the cassette Finally, such a cassette requires many parts and thus high construction costs.

SUMMARY OF THE INVENTION

It is therefore an object of the present invention to provide a photographic film cassette in which a cassette shell of resin can be easily assembled.

It is another object of the present invention to provide a photographic film cassette from which a photographic film can be efficiently removed after exposure In order to achieve the above and other objects and advantages of this invention, the present invention is a film cassette having first and second shell halves for constructing a shell. At least one first engaging portion is formed on one of the shell halves; and at least one second engaging portion is formed on the other shell half so as to engage with the first engaging portion when the two shell halves are integrally joined together. The second engaging portion is disengaged from the first engaging portion when disassembling the cassette shell in order to remove the photographic film with the spool.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
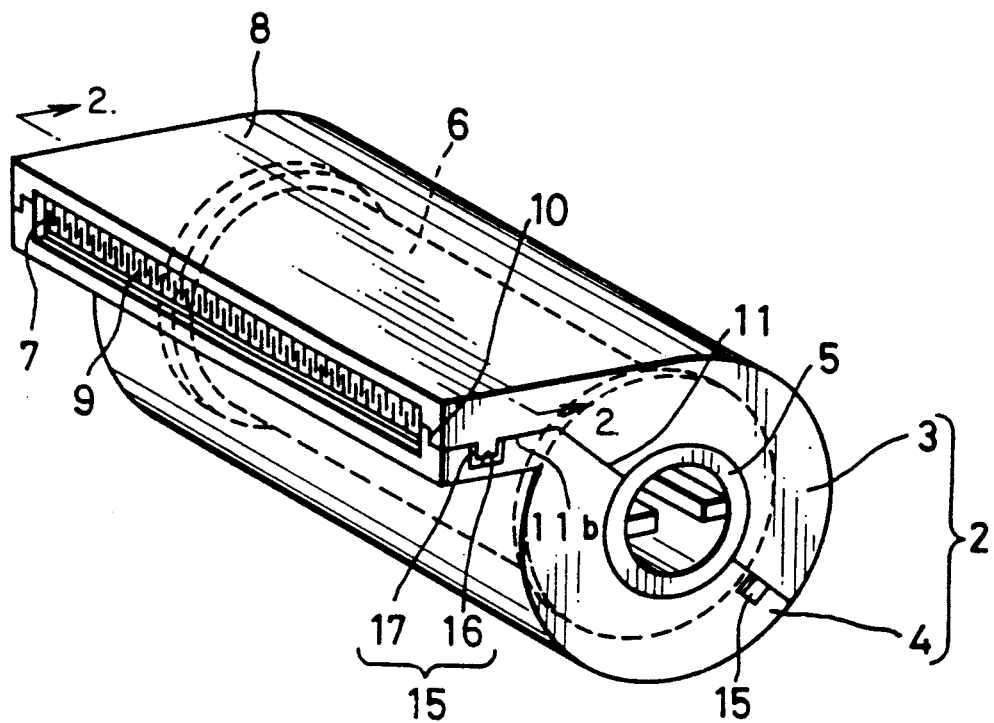
FIG. 1 is a perspective view illustrating a photographic film cassette according to a first preferred embodiment of the present invention.

FIG. 1 illustrates a photographic film cassette in accordance with the first embodiment of the present invention. Cassette shell 2 consists of upper and lower shell halves 3 and 4 molded from opaque materials, e.g. polystyrene resin, or the like, and contains photographic film 6 wound around spool 5. Because of the elasticity of polystyrene resin, it is preferable to include high-impact polystyrene of at least 5%, optimally about 30%. The cylindrical circumference of cassette shell 2 is provided with port section 8 having film passage mouth 7 formed on an end thereof. The width of port section 8 and passage mouth 7 is defined by lateral surfaces of cassette shell 2. Plush material (teremp cloth, etc.) 9 for trapping light is attached to an inside of port section 8 and prevents light from entering cassette shell 2 through film passage mouth 7.

Figure 2:
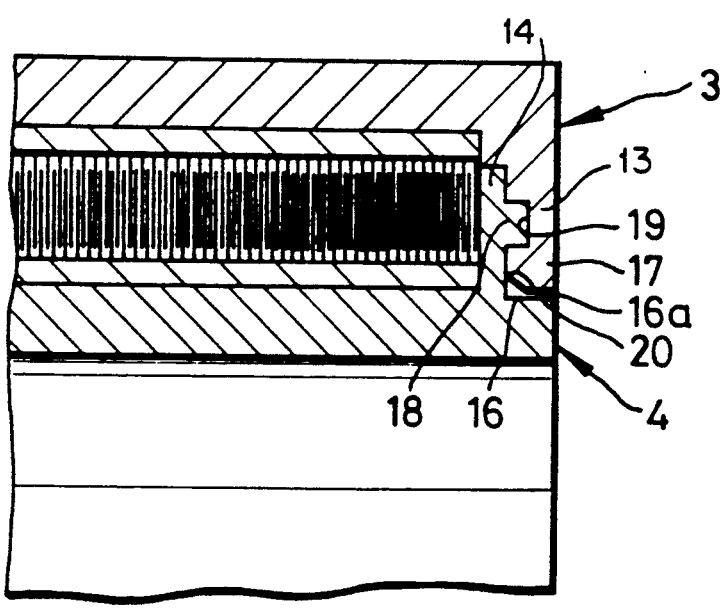
FIG. 2 is a partial sectional view taken on line 2—2 in FIG. 1.

Stepped edges 13 and 14 (see FIG. 2) are formed along edges of shell halves 3 and 4, respectively, to be joined together, and prevent light from entering cassette shell 2 through juncture 11 of shell halves 3 and 4. In particular, stepped edge 14 is formed on an outside edge of shell half 4 and stepped edge 13 is formed on an inside edge of shell half 3 (see FIG. 2). Each of the two lateral surfaces of cassette shell 2 is provided with two engaging structures 15 formed along juncture 11, each consisting of receiving recess 16 and tongue 17. Juncture 11 includes first juncture portion 11a, which extends parallel to a longitudinal axis of spool 5, and second juncture portion 11b, which extends along lateral surfaces of cassette shell 2 (see FIGS. 1 and 3). Arresting projection 18 is formed so as to project from stepped edge 10 of lower shell half 4 on the surface of receiving recess 16 as illustrated in FIG. 2. Tongue 17 which projects from stepped edge 13 formed on upper shell half 3, is provided with inclined surface 20 arresting recess 19 is formed in stepped edge 13 for being fitted on arresting projection 18 so as to join shell halves 3 and 4. Inclined surface 20 makes it easy to fit arresting projection 18 in arresting recess 19 by virtue of contact with arresting projection 18 which is formed on stepped edge 14, in a sliding manner so as to deform tongue 17 in an outward direction in order to join the two shell halves 3 and 4 in engagement.

Figure 3A:
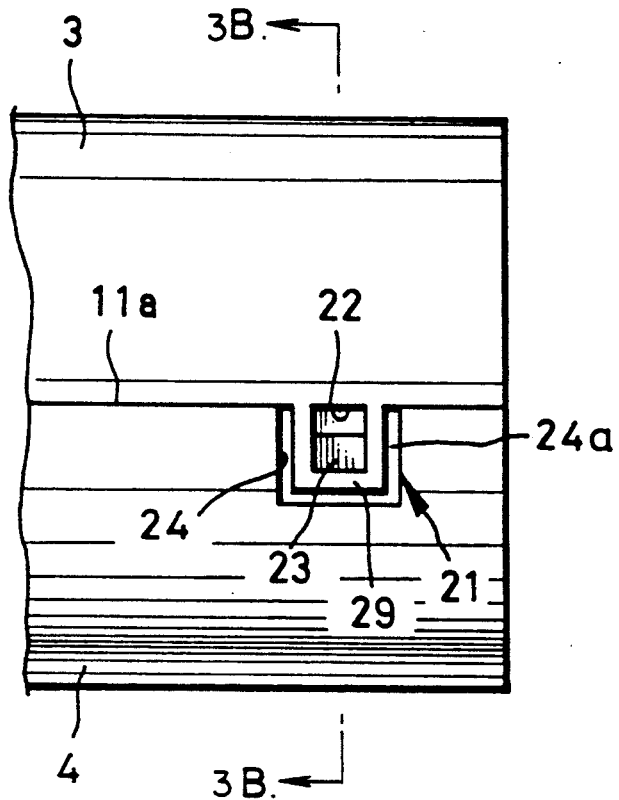
FIG. 3A is a partial rear view illustrating the film cassette illustrated in FIG. 1.
Figure 3B:
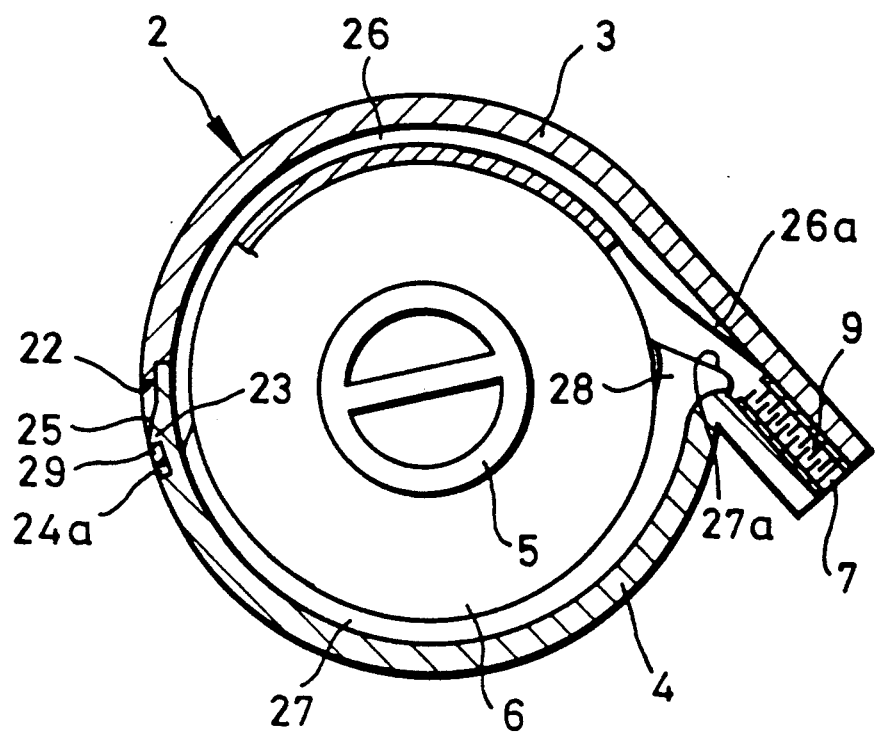
FIG. 3B is a sectional view taken on line 3B—3B in FIG. 3A.

Another engaging structure 21 for joining shell halves 3 and 4 is provided on the circumferential surface of cassette shell 2 along juncture as illustrated in FIG. 3A, and consists of arresting opening 22 formed on upper shell half 3 and arresting claw 23 formed on lower shell half 4. When arresting claw 23 is fitted in arresting opening 22 as illustrated in FIG. 3B, receiving recess 24 formed on lower shell half 4 receives tongue 29 on which arresting opening 22 is formed. Arresting claw 23 is provided with inclined surface 25 so as to provide easy seating of arresting claw 23 in arresting opening 22. It is desirable for reliability in shielding light and securing in position, to form such a positioning structure by combination of an engaging projection and a recess.

Upper and lower annular ridges 26 and 27 are formed on the inside of shell halves 3 and 4 for contact with the outer surface of the roll of film 6 in order to prevent the roll of film 6 from loosening. Ends of annular ridges 26 and 27 are provided with guide ridges 26a and 27a respectively for guiding a leading end of photographic film 6 toward plush material 9. Separating claw 28 is formed on guide ridge 27a near the entrance to port section 8 for separating the leading end from the outer surface of the roll of film 6. When spool 5 is rotated in a direction of unwinding of photographic film 6, i.e., clockwise in FIG. 3B, the leading end of photographic film 6 is rotated in the same direction. The leading end is contacted by separating claw 28, separated from the roll of film 6, guided by guide ridges 26a and 27a, and advanced out of cassette shell 2 through film passage mouth 7.

The operation of assembling the film cassette as constructed above will now be described. Spool 5, with photographic film 6 wound thereon, is inserted in lower shell half 4, which is joined with upper shell half 3. In engaging structure 15, arresting projection 18 is engaged with inclined surface 20 to deform tongue 17 in an outward direction. The end of tongue 17 easily passes over arresting projection 18. When arresting projection 18 is fitted in arresting recess 19, shell halves 3 and 4 are fixedly joined. Gap 16a is defined in receiving recess 16 when tongue 17 is received in receiving recess 16, because the depth of receiving recess 16 is designed to be longer than the length of tongue 17. In engaging structure 21, inclined surface 25, when joining shell halves 3 and 4, is in contact with stepped edge 10 of upper shell half 3 and deforms tongue 29 in an outward direction, or to the left in FIG. 3B. Arresting claw 23 is fitted in arresting opening 22 to fix shell halves 3 and 4 to one another. The four engaging structures 15 and the two engaging structures 21 fix shell half 3 to shell half 4, thereby completing assembly of cassette shell 2. Spacing 24a is defined in receiving recess 24 when tongue 29 is received in receiving recess 24, because the depth of receiving recess 24 is designed to be longer than the length of tongue 29.

In order to take photographic film 6, from cassette shell 2 in a photolaboratory, the tip of a tool such as a screwdriver is inserted in gaps 16a and spacings 24a, so as to deform the tips of tongues 17 and 29 outward. This disengages arresting recess 19 from arresting projection 18 and arresting opening 22 from arresting claw 23. Cassette shell 2 is thus disassembled into shell halves 3 and 4 so as to easily remove photographic film 6 easily. It is noted that shell halves 3 and 4, of the first preferred embodiment, are joined by engaging structures 15 and 21, but alternatively only one set of engaging structures 15 or 21 may be utilized.

Figure 4:
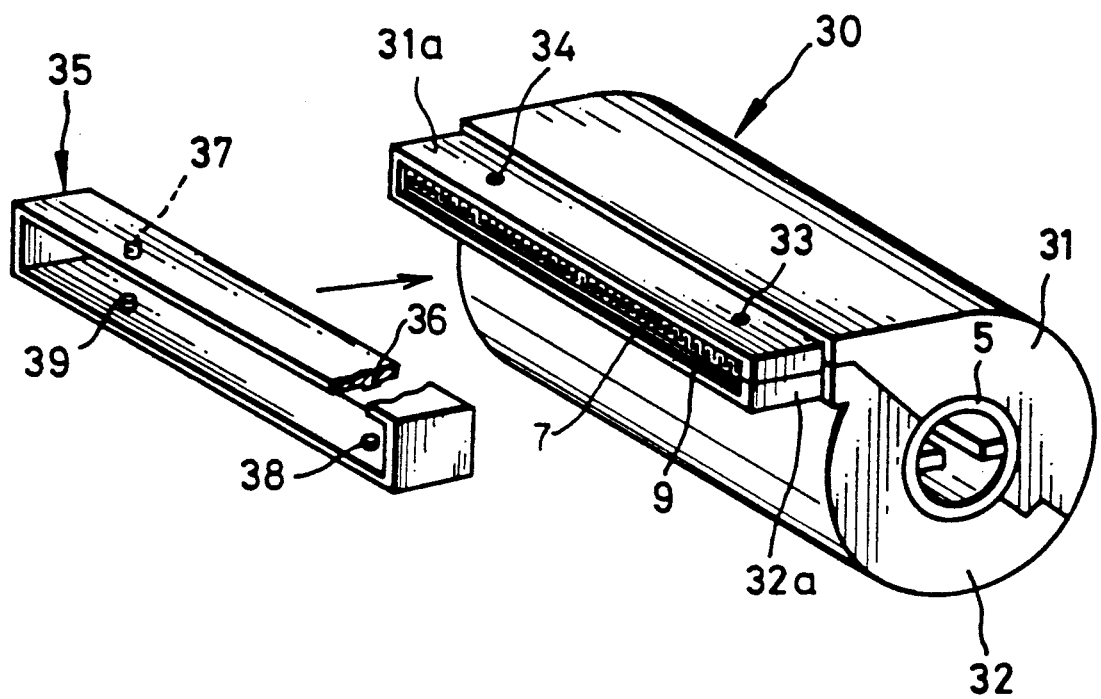
FIG. 4 is an exploded perspective view illustrating a film cassette according to a second preferred embodiment.

FIG. 4 illustrates a film cassette according to a second preferred embodiment. Cassette shell 30 consists of a pair of shell halves 31 and 32. Shell halves 31 and 32 are provided with tongue portions 31a and 32a defining port sections. Plush material (teremp cloth, etc.) 9 is attached to the inside of tongue portions 31a and 32a, which define film passage mouth 7 therebetween. Two arresting holes 33 and 34 are formed on an upper surface of tongue portion 31a, whereas two arresting holes (not shown) are formed on a lower surface of tongue portion 32a.

Salient portions 31a and 32a are fitted into yoke member 35 which is slid in the direction indicated by the arrow in FIG. 4. Yoke member 35 prevents shell halves 31 and 32 from being separated in the vertical direction, and covers a juncture between salient portions 31a and 32a to prevent light from entering the port section. Yoke member 35 is formed from a resin of a high elasticity, such as ethylene-vinyl acetate copolymer (EVA), low density polyethylene (LDPE), high density polyethylene (HDPE), polypropylene (PP), high-impact polystyrene (HIPS), polyacetal (POM) and ABS resin Arresting projections 36 and 37 are formed on an upper surface of the inside of yoke member 35, whereas arresting projections 38 and 39 are formed on a lower surface thereof.

Figure 5:
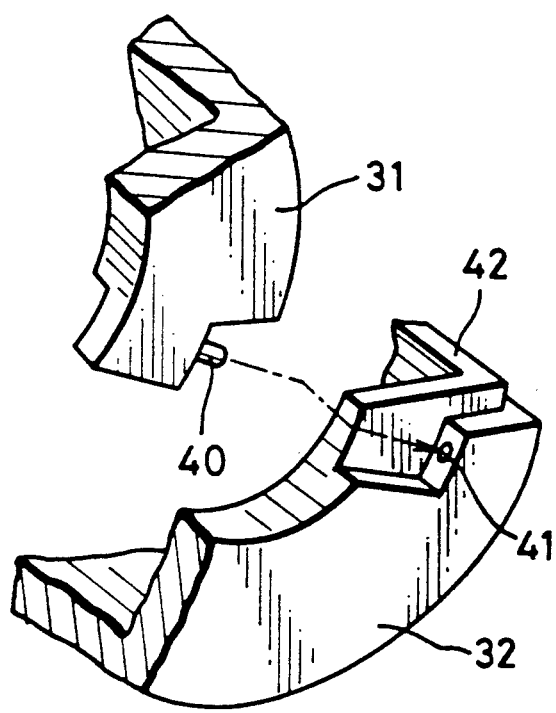
FIG. 5 is an exploded partial perspective view illustrating the film cassette illustrated in FIG. 4.

FIG. 5 illustrates an engaging structure for coupling the two shell halves in a position remote from the port section. This engaging structure consists of engaging hole 41 formed on shell half 32 for receiving pin 40. Stepped edge 42 of shell half 32 prevents light from entering the juncture of shell halves 31 and 32.

The operation of assembling the film cassette of the second embodiment will now be described. When shell halves 31 and 32 are joined together with pin 40 inserted in engaging hole 41, cassette shell 30 takes a state as illustrated in FIG. 4. Yoke member 35 is attached to salient portions 31a and 32a by sliding it in the direction of the arrow, arresting projections 36 and 37 are engaged in arresting holes 33 and 34 respectively. Arresting projections 38 and 39 are fitted in the holes (not shown) on tongue portion 32a. Accordingly, assembly of cassette shell 30 is completed.

To disassemble cassette shell 30, yoke member 35 is drawn out in the direction opposite to the arrow and taken away from cassette shell 30. Upper shell half 31 is slid upward relatively to lower shell half 32 so that pin 40 is drawn out of hole 41. The photographic film (not shown) wound on spool 5 can be easily removed from cassette shell 30 for processing.

Figure 6:
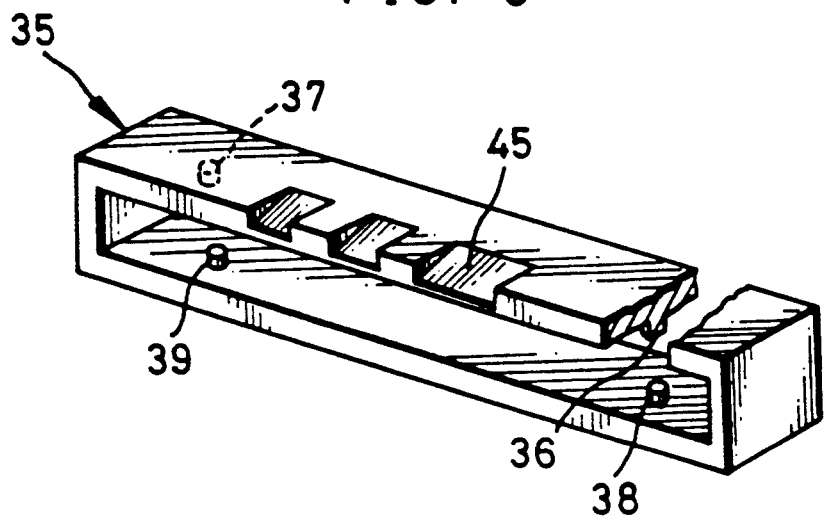
FIG. 6 is a perspective view, in partial section, illustrating another example of a yoke member illustrated in FIG. 4.

As illustrated in FIG. 6, DX code indication 45 can be formed on yoke member 35 used in the embodiment of FIG. 4 for indicating the type of photographic film 6 and film characteristics, such as the film sensitivity, for example. DX code indication 45 is indicated by a pattern of indentations and projections. When the film cassette is loaded in a camera, a microswitch of the camera for detecting the DX code is turned on/off according to the disposition of indentations and projections. Although the bottom surfaces of the indented portions are inclined in FIG. 6, the retracted portions may lack such inclination.

Figure 7A:
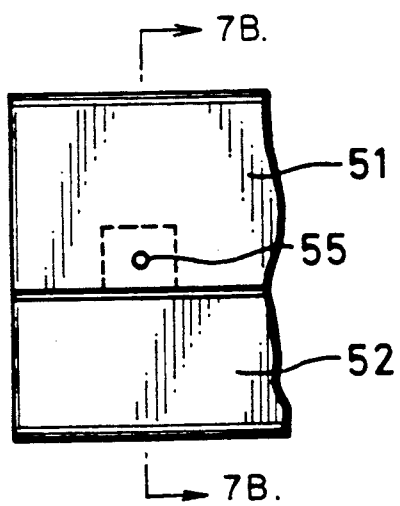
FIG. 7A is a side view illustrating a port section of a film cassette according to a third preferred embodiment.
Figure 7B:
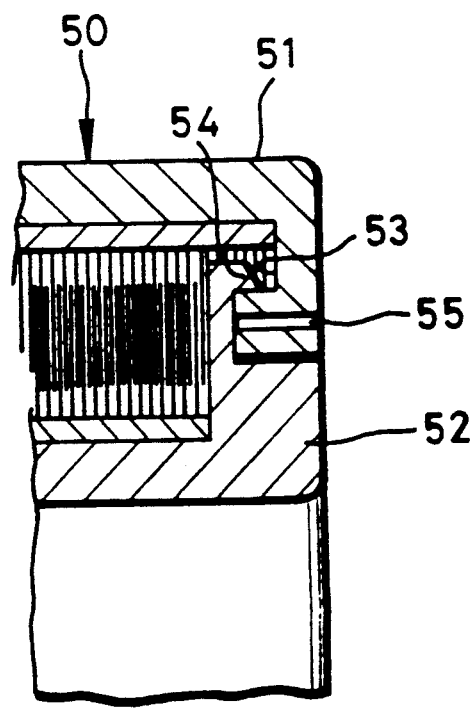
FIG. 7B is a partial sectional view taken on line 7B—7B in FIG. 7A.

FIGS. 7A and 7B illustrate an important portion of a film cassette according to a third preferred embodiment, cassette shell 50 consists of shell halves 51 and 52. As illustrated in FIG. 7B, recess 53 is formed on upper shell half 51 on the inside, and coupled with claw 54 formed on lower shell half 52 to fix shell half 51 on shell half 52. The stepped edge of upper shell half 51 is provided with a hole 55 for inserting a long thin jig (see FIG. 7A).

The operation of this film cassette will now be described. The two shell halves 51 and 52 are joined together by engaging recess 53 with claw 54 so as to form cassette shell 50. When disassembling cassette shell 50, a jig such as an awl is inserted in hole 55 so as to press the stepped edge of lower shell half 52 so that claw 54 is released from recess 53. Then cassette shell 50 is disassembled into shell halves 51 and 52.

Figure 8:
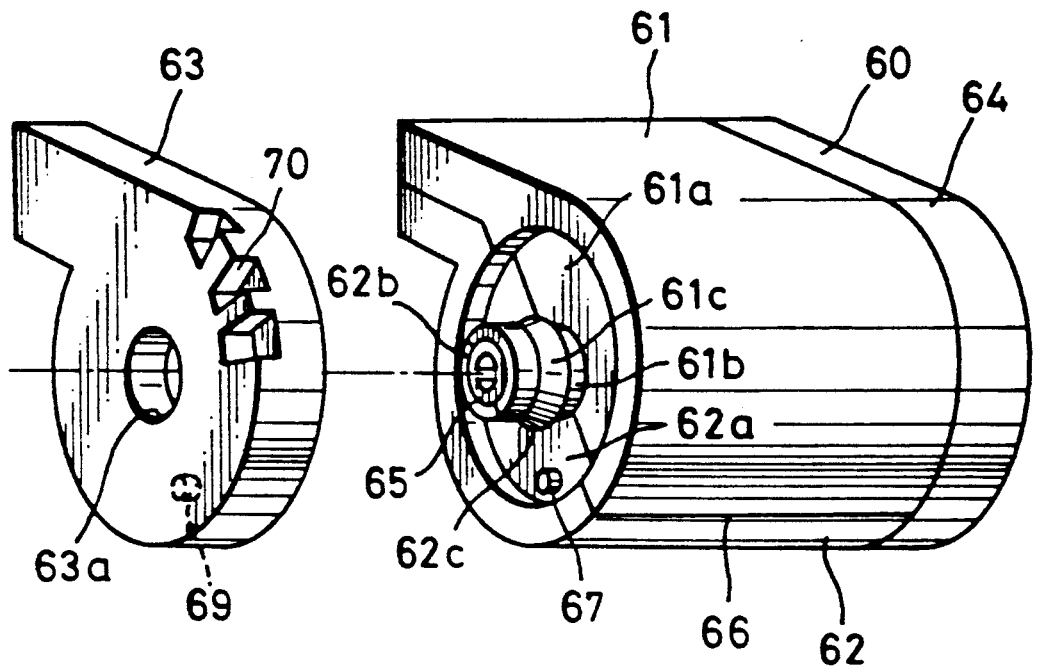
FIG. 8 is an exploded perspective view illustrating a film cassette according to a fourth preferred embodiment.
Figure 9:
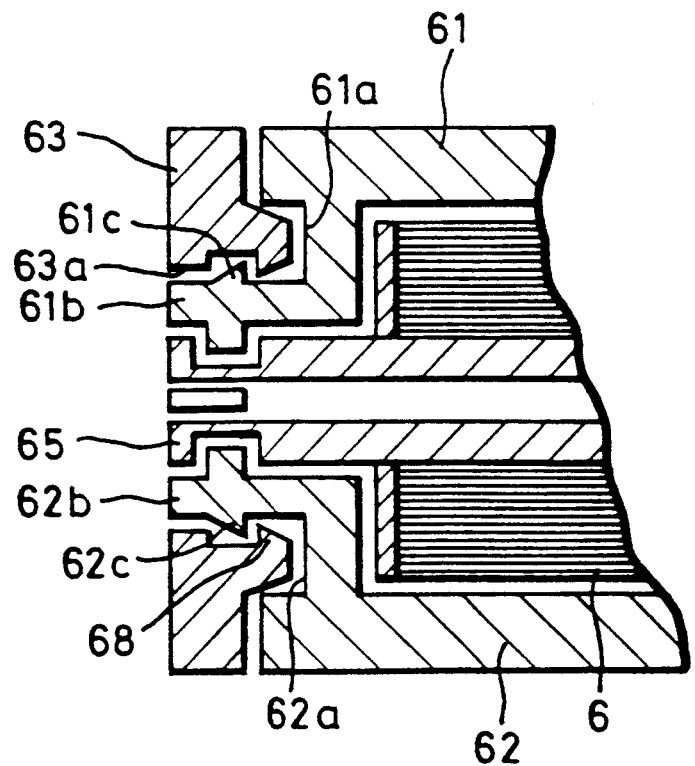
FIG. 9 is a sectional view illustrating an important portion of the film cassette illustrated in FIG. 8.

Cassette shell 60 according to the fourth preferred embodiment is illustrated in FIGS. 8 and 9 and consists of two shell halves 61 and 62, and two end face members 63 and 64 to be fitted on both lateral sides of the two shell halves 61 and 62. Spool 65 with the photographic film (not shown) is rotatably contained between shell halves 61 and 62 as illustrated in FIG. 8. Ends of spool 65 project from the lateral sides of shell halves 61 and 62. Juncture 66 between shell halves 61 and 62 has stepped edges which lap one over another similarly to stepped edges 10 in FIG. 1 which prevent light from entering cassette shell 60 through juncture 66.

Lateral sides 61a and 62a of shell halves 61 and 62 are provided respectively with sleeve halves 61b and 62b to project from lateral sides 61a and 62a so as to cover and support the ends of spool 65. Pin is formed on lateral side 62a of lower shell half 62. Annular ridges 61c and 62c of which the circumferential top is inclined are integrally formed on the cylindrical surface of sleeve halves 61b and 62b, and connected together in an annular shape when joining shell halves 61 and 62 together. Circular hole 63a is formed on end face member 63 for inserting a sleeve constituted of sleeve halves 61b and 62b. The inside of hole 63a is provided with annular ridge 68 so as to encircle hole 63a. End face member 63 is provided with receiving recess 69 for receiving pin 67. DX code indication 70 is formed on the outside of end face member 63 in a manner similar to the film cassette illustrated in FIG. 6. Opposite end face member 64 is in the same construction as end face member 63 except for the lack of a DX code indication.

In accordance with the above construction, shell halves 61 and 62 are applied to one another with spool 63 and the roll of film 6 contained inside so as to form sleeve halves 61b and 62b into a sleeve. When end face member 63 is attached to the lateral side of shell halves 61 and 62, annular ridge 68 of end face member 63 engages with annular ridges 61c and 62c of sleeve halves 61b and 62b so as to maintain end face member 63 on shell halves 61 and 62. The assembly of the film cassette is completed by fitting the other end face member 64 on the opposite lateral side of shell halves 61 and 62. End face member 63 is correctly positioned by engagement of pin 67 with receiving recess 69. There is no need for ultrasonic welding or the use of adhesive agents for assembling a film cassette of the fourth embodiment, thereby facilitating assembly. In a photolaboratory, photographic film 6 can be removed while still wound on spool 65 by detaching end face members 63 and 64.

Figure 10:
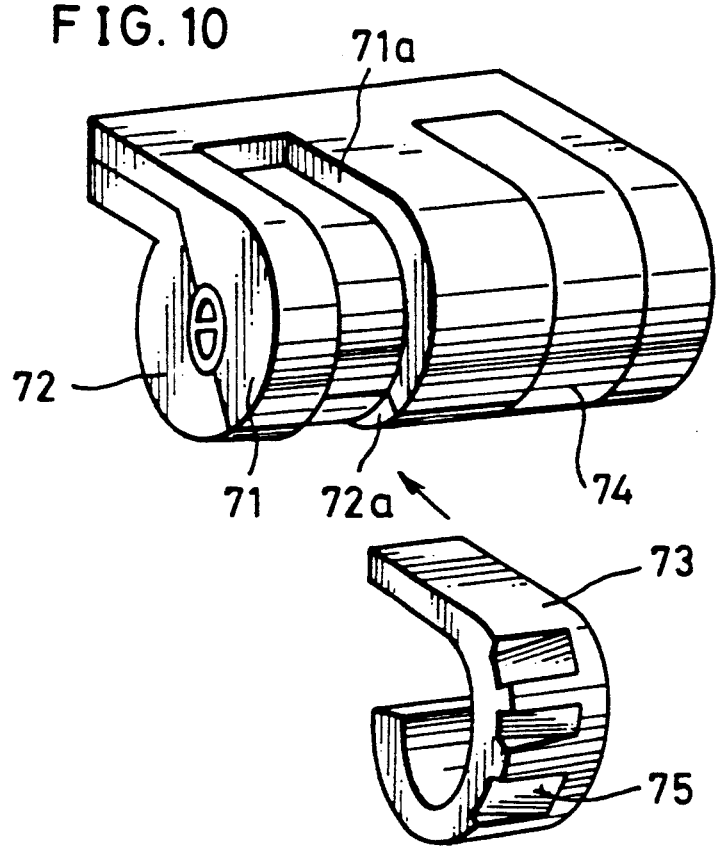
FIG. 10 is an exploded perspective view illustrating film cassettes according to a fifth preferred embodiment.

FIG. 10 illustrates a fifth preferred embodiment of the present invention. A pair of shell halves 71 and 72 are joined by using U-shaped joining members 73 and 74. Recesses 71a and 72a are formed on surfaces of shell halves 71 and 72 for fitting joining members 73 and 74 therein. Joining members 73 and 74 are molded from an elastic resin, or the like, and are fitted in recesses 71a and 72a so as to secure shell halves 71 and 72 together. A surface portion of joining member 73 is provided with DX code indication 75.

Figure 11:
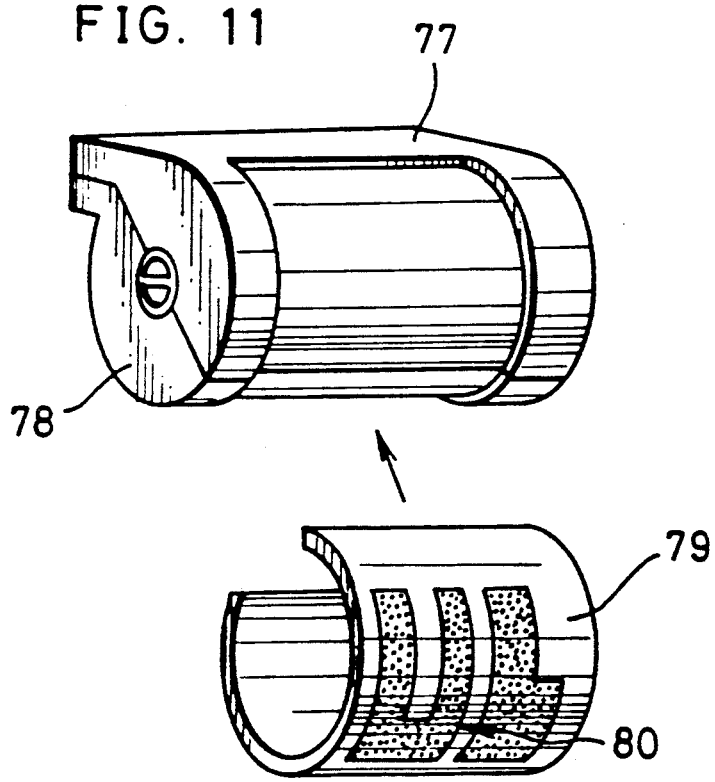
FIG. 11 is an exploded view of a film cassette according to a sixth preferred embodiment of the present invention.

FIG. 11 illustrates a sixth preferred embodiment. Joining member 79 for joining shell halves 77 and 78 together in FIG. 11 is made of a conductive metal plate. DX code indication 80 is provided on the surface of joining member 79, and consists of a layer printed or laminated with an insulating material in a pattern corresponding to a DX code, so as to define a code in accordance with the conductive and nonconductive sections of the surface of joining member 79. DX code indication 80 is read by detecting the insulating pattern or the opposite conductive pattern with contact terminals in a camera. It is also possible to make a joining member of an insulating resin and to print a pattern with a conductive material thereon corresponding to the DX code indication.

According to either of the embodiments in FIGS. 10 and 11, shell halves 71 and 72, or 77 and 78 are easily assembled and disassembled by attaching/detaching joining members 73 and 74 or 79. Also, no additional cost or machining is required in order to provide DX code indication.

The construction of the film cassette according to the present invention is described above. The resin as material for forming the cassette shell and the spool is preferably a thermoplastic resin, or the like, which is inexpensive and adaptable to injection molding, such as polystyrene resin (high-impact polystyrene resin including rubber, among others), ABS resin, and polyolefin resin (high density polyethylene resin, homopolypropylene resin, propylene/alpha olefin random copolymer resin, and propylene/alpha olefin block copolymer resin, among others). Of course, the material should include a light-shielding material or light screen as a component, such as carbon black pigments, black dye, metallic powder, aluminum paste, and the like.

Most desirably, the cassette is constructed of a material of which the main component is a polyblend of high-impact polystyrene resin and polypropylene resin (e.g. homopolypropy lene resin, propylene/ethylene random copolymer resin, and propylene/ethylene block copolymer resin), or a polyblend of at least two of polypropylene resin, ethylene copolymer resin, and rubber. The resin for forming the spool may be either the same as or different from that for forming the cassette shell.

Thermoplastic resins that are adaptable to injection molding are not limited to the abovementioned examples, but can be any kind of thermoplastic resin, or the like. Additives can be added to the resin in order to provide desirable characteristics, such as enlarging injection capacity and prevent deterioration.

It is preferable, for strengthening purposes, to add to the resin a conductive material, such as nonionic surface active agent (whose main component is polyoxyethylene glycol), anion surface active agent (whose main component is polyoxyethylene glycol), cation surface active agent (whose main component is quaternary ammonium salt), ampholytic surface active agent, alkyl amine derivative, aliphatic acid derivative, several kinds of lubricant, carbon black, graphite, metallic surface coating pigment, metallic powder, metallic flake, carbon fiber, metallic fiber, and whisker (potassium titanate, alumina nitride, and alumina).

The above-mentioned nonionic surface active agent is, for example, polyethylene glycol fatty ester, polyoxyethylene sorbitan fatty ester, polyoxyethylene fatty alcohol ether, polyoxyethylene alkyl phenyl ether, polyoxyethylene glycerin fatty ester, polyoxyethylene fatty amine, sorbitan mono fatty ester, fatty acid pentaerythritol, addition product of fatty alcohol to ethylene oxide, fatty acid ethyleneoxide adduct, addition product of fatty amino or fatty amide to ethylene oxide, addition product of alkylphenol to ethylene oxide, addition product of alkyl naphthol to ethylene oxide, addition product of fatty partial ester of polyvalent alcohol to ethylene oxide, and several kinds of antistatic agent described in Japanese Patent Publication No. 63-26697, page 120.

Examples of the above-mentioned anionic surface active agents are sodium salt of ricinoleic acid sulfur ester, various metallic salt of fatty acid, sodium salt of sulfur ester of ricinoleic acid ester, sulfonated oleic acid ethylaniline, salts of sulfur ester of olefin, sodium salt of oleyl alcohol sulfur ester, salt of alkyl sulfonate, fatty acid ethyl sulfonate, alkyl sulfonate, alkyl naphthalate sulfonate, alkyl benzene sulfonate, succinate ester sulfonate, and salt of phosphoric acid ester.

The above-mentioned cation surface active agent is for example primary amine salt, tertiary amine salt, quaternary ammonium salt, and pyridine derivative. The above ampholytic surface active agent is for example carboxylic acid derivative, imidazoline derivative, and betaine derivative. An antistatic agent or conductive material is preferably added at an amount of 0.01 to 3.0 wt%.

A good example of a light screen or light-shielding material added for shielding the cassette shell and the spool from light, is the inorganic compound as referred to below.

1) Oxide, such as: silica, diatomaceous earth, alumina, titanium oxide, iron oxide, zinc oxide, magnesium oxide, antimony oxide, barium ferrite, strontium ferrite, beryllium oxide, pumice stone, pumice stone balloon, and alumina fiber.
2) Hydroxide, such as: aluminum hydroxide, magnesium hydroxide, and basic magnesium carbonate.
3) Carbonate, such as: calcium carbonate, magnesium carbonate, dolomite, and danalite.
4) Sulfate and sulfite, such as: calcium sulfate, barium sulfate, ammonium sulfate, and calcium sulfite.
5) Silicate, such as: talc, clay, mica asbestos, glass fiber, glass balloon, glass bead, calcium silicate, montmorrilonite, and bentonite.
6) Carbon, such as: carbon black, graphite, carbon fiber, and carbon hollow sphere.
7) Other compounds, such as: iron powder, copper powder, lead powder, aluminum powder, molybdenum sulfide, phorone fiber, silicon carbide fiber, brass fiber, potassium titanate, lead titanate zirconate, zinc borate, barium metaborate, calcium borate, natrium borate, and aluminum paste.

Carbon black is the most preferable, because it has little influence over a photographic film, has great capacity for shielding light, and is inexpensive. Carbon black is classified according to raw materials as gas black, furnace black, channel black, anthracene black, acetylene black, ketene carbon black, thermal black, lamp black, oil smoke, pine smoke, animal black, and vegetable black.

Among the above, furnace black is preferable in view of its light-shielding capacity, low cost and high quality. Acetylene black and ketene carbon black being a modified by-produced carbon black are preferable in view of light-shielding capacity as well as antistatic properties, though expensive. Different types of such carbon black are preferably mixed in accordance with desired properties. Among several methods of including light-shielding material in polyethylene polymer, the master batch method is preferable because of low cost and minimal environmental problems.

It is also preferable, for the purpose of reducing friction, improving injecting capacity and preventing static electricity buildup, to add a lubricant to the resin for forming the cassette shell and the spool at an amount from 0.01 to 5.0 wt%. A lubricant of fatty acid amide type may be added at 0.01 to 1.0 wt%, because its lubricant properties are high and it tends to bleed out.

Examples of lubricants that are harmless to the photographic film, available in the market, as well as manufacturers thereof are referred to below.

1) Silicone lubricants: dimethyl polysiloxane of various grades and modification thereof (manufactured by Sinetsu Chemical Co., Ltd. and Toray Silicone Co., Ltd.), etc.
2) Oleic acid amide lubricants: ARMO SLIP-CP (merchandise name; manufactured by Lion Akzo Co., Ltd.), NEWTRON (merchandise name; manufactured by Nippon Fine Chemical Co., Ltd.), NEWTRON E-18 (merchandise name; manufactured by Nippon Fine Chemical Co., Ltd.), AMIDE-O (merchandise name; manufactured by Nitto Chemical Industry Co., Ltd.), ALFLOW E-10 (merchandise name; manufactured by Nippon Oil and Fats Co., Ltd.), DIAMID O-200 (merchandise name; manufactured by Nippon Kasei Chemical Co., Ltd.), DIAMID G-200 (merchandise name; manufactured by Nippon Kasei Chemical Co., Ltd.), etc.
3) Erucic acid amide lubricants: ALFLOW P10 (merchandise name; manufactured by Nippon Oil and Fats Co., Ltd.), etc.
4) Stearic acid amide lubricants: ALFLOW S-10 (merchandise name; manufactured by Nippon Oil and Fats Co., Ltd.), NEWTRON (merchandise name; manufactured by Nippon Fine Chemical Co., Ltd.), DIAMID 200 (merchandise name; manufactured by Nippon Kasei Chemical Co., Ltd.), etc.
5) Bis fatty acid amide lubricants: BISAMIDE (merchandise name; manufactured by Nitto Chemical Industry Co., Ltd.), DIAMID 200 BIS (merchandise name; manufactured by Nippon Kasei Chemical Co., Ltd), ARMO WAX-EBS (merchandise name; manufactured by Lion Akzo Co., Ltd.), etc.

6) Alkyl amine lubricants: ELECTROSTRIPPER TS-2 (merchandise name; manufactured by Kao Corporation), etc.

7) Hydrocarbon lubricant: liquid paraffin, natural paraffin, micro wax, synthetic paraffin, polyethylene wax, polypropylene wax, chlorinated hydrocarbon, and fluorocarbon.

8) Fatty acid lubricant: higher fatty acid (whose preferable number of carbon atoms is $C_{12}$ or more), and oxy fatty acid.

9) Ester lubricant: fatty acid lower alcohol ester, fatty acid polyvalent alcohol ester, fatty acid polyglycol ester, and fatty acid fatty alcohol ester.

10) Alcohol lubricant: polyvalent alcohol, polyglycol, and polyglycerol.

11) Metallic soap: compounds of higher fatty acids such as lauric acid, stearic acid, ricinoleic acid, naphthenic acid and oleic acid and metals such as Li, Mg, Ca, Sr, Ba, Zn, Cd, Al, Sn and Ph.

Additives and examples thereof added as required to the resin for forming the cassette shell and the spool are referred to as below. Naturally, the additives to be used are not limited to these examples but can be any known kind and depend upon the properties desired.

1) Plasticizer: phthalate ester, glycol ester, fatty acid ester, and phosphate ester.
2) Stabilizer: lead type, cadmium type, zinc type, alkali earth metal type, and organo-tin type.
3) Flame retarder: phosphate ester, halogenated phosphate ester, halide, inorganic matter, and phosphorus-including polyol.
4) Filler: alumina, kaolin, clay, calcium carbonate, mica, talc, titanium oxide, and silica.
5) Reinforcer: glass roving, metal fiber, glass fiber, glass middle fiber, and carbon fiber.
6) Foaming agent: inorganic foaming agents (ammonium carbonate and sodium bicarbonate) and organic foaming agents (nitroso type and azo type).
7) Vulcanizer: vulcanizing accelerator and supplement accelerator.
8) Deterioration inhibitor: ultraviolet light absorber, metal inactivation agent and peroxide decomposer.
9) Coupling agent: silane type, titanate type, chrome type, and aluminum type.
10) Various thermoplastic resins and rubber.
11) Nucleator: organic nucleator (dibenzylidene sorbitol compound) and inorganic nucleator (calcium carbonate).

Although the present invention has been described by way of preferred embodiments thereof with reference to the accompanying drawings, various changes and modifications will be apparent to those having working skill in the field. Therefore, unless these changes and modifications depart from the scope of the present invention, as recited in the appended claims, they should be construed as being included therein.

What is claimed is:

1. A photographic film cassette comprising:
a spool having a photographic film wound thereon;
a cassette shell containing said spool, said cassette shell being formed from first and second shell halves which are joined together along a first juncture that extends parallel to a longitudinal axis of said spool and along a second juncture that extends along lateral surfaces of said cassette wheel which define to a port section defined in said cassette shell so as allow said photographic film to advance therethrough to an outside of said cassette shell;
a first stepped edge formed along said second juncture on an outside surface of said first shell half, said first stepped edge having an arresting recess formed on an inside surface thereof;
a first tongue projecting from said second stepped edge;
a second stepped edge formed along said first juncture on an inside surface of said second shell half, said first and second stepped edges being in overlapping contact when said first and second shell halves are joined together so as to prevent light from entering said cassette shells aid second stepped edge having a first receiving recess formed therein, said first tongue being received in said first receiving recess when said shell halves are joined together; and
a first arresting projection formed on an outside surface of said second stepped edge, said first arresting projection being engaged with said arresting recess when said first and second shell halves are joined together.

2. A photographic film cassette as defined in claim 1, further comprising means for guiding a leading end portion of said photographic film out of said port section when said spool is rotated in a direction corresponding to unwinding of said photographic film.

3. A photographic film cassette as defined in claim 1, wherein an inclined surface is formed on an inside surface of said first tongue for slidable contact with said first arresting projection in order to deform said first tongue in an outward direction when joining said shell halves so as to facilitate engagement said first arresting projection and said arresting recess.

4. A photographic film cassette as defined in claim 1, wherein said first receiving recess define a gap of said first receiving recess defined in a gap therebetween when said first tongue is received in said first receiving recess.

5. A photographic film cassette as defined in claim 1 further comprising:
a second tongue formed on a circumferential wall of said first shell half so as to project from said first stepped edge;
a second receiving recess formed on a circumferential wall of said second shell half on said second stepped edge adapted to receive said second tongue;
an arresting opening formed on an inside of said second tongue; and
a second arresting projection formed so as to project from an outside of said second receiving recess for engagement with said arresting opening.

6. A photographic film cassette as defined in claim 5, wherein an inclined surface is formed on an outside surface of said second arresting projection for slidable contact with said second tongue in order to deform said second tongue in an outward direction so as to facilitate engagement of said second arresting projection and said arresting opening.

7. A photographic film cassette as defined in claim 6, wherein said second tongue and a lateral wall of said second receiving recess define a gap therebetween when said second tongue is engaged with said second receiving recess.

* * * * *